(12) United States Patent
Cherif et al.

(10) Patent No.: US 7,507,438 B2
(45) Date of Patent: Mar. 24, 2009

(54) DISPLAY SUBSTRATE WITH DIFFUSER COATING

(75) Inventors: Mondher Cherif, Holland, MI (US); Brian M. Tallon, Zeeland, MI (US); Eugene L. Halsey, IV, Holland, MI (US)

(73) Assignee: Donnelly Corporation, Holland, MI (US)

( * ) Notice: Subject to any disclaimer, the term of this patent is extended or adjusted under 35 U.S.C. 154(b) by 486 days.

(21) Appl. No.: 11/218,374

(22) Filed: Sep. 2, 2005

(65) Prior Publication Data

US 2006/0078691 A1 Apr. 13, 2006

Related U.S. Application Data

(60) Provisional application No. 60/607,332, filed on Sep. 3, 2004.

(51) Int. Cl.
*B05D 5/06* (2006.01)
(52) U.S. Cl. .................. 427/168; 427/600; 427/248.1; 427/372.2; 118/612
(58) Field of Classification Search .......... 427/600, 427/248.1, 372.2, 168, 162, 163.3; 118/612
See application file for complete search history.

(56) References Cited

U.S. PATENT DOCUMENTS

| | | | |
|---|---|---|---|
| 2,474,061 A | 6/1949 | Moulton | |
| 2,584,905 A | 2/1952 | Moulton et al. | |
| 2,655,452 A | 10/1953 | Barnes et al. | |
| 2,680,205 A | 6/1954 | Burton | |
| 2,782,676 A | 2/1957 | Osterberg | |
| 3,094,436 A | 6/1963 | Schroder | |
| 3,356,522 A | 12/1967 | Libbert | |
| 3,635,751 A | 1/1972 | Long, III et al. | |
| 3,679,451 A | 7/1972 | Marks et al. | |
| 3,811,918 A | 5/1974 | Levene | |
| 4,161,547 A | 7/1979 | Kienel | |
| 4,260,222 A | 4/1981 | Kozawa | |
| 4,282,290 A | 8/1981 | Pellicori et al. | |
| 4,289,822 A | 9/1981 | Shimada et al. | |
| 4,346,131 A | 8/1982 | Yoldas | |
| 4,349,369 A * | 9/1982 | Van Laethem et al. | ....... 65/60.4 |
| 4,361,598 A | 11/1982 | Yoldas | |
| 4,446,171 A | 5/1984 | Thomas | |
| 4,535,026 A | 8/1985 | Yoldas et al. | |
| 4,596,745 A | 6/1986 | Chao | |
| 4,652,467 A | 3/1987 | Brinker et al. | |
| 4,671,990 A | 6/1987 | Jada et al. | |

(Continued)

*Primary Examiner*—Alain L Bashore
(74) *Attorney, Agent, or Firm*—Van Dyke, Gardner, Linn & Burkhart LLP

(57) ABSTRACT

A system for coating a substrate surface with a diffuser coating includes an ultrasonic vibrating device, a supply device and a low pressure air source. The supply device supplies a liquid coating material or precursor solution to the ultrasonic vibrating device. The ultrasonic vibrating device is operable to vibrate to atomize the coating material and to discharge airborne particles at a discharge end of the ultrasonic vibrating device. The low pressure air source generates low pressure air flow generally proximate to the discharge end to guide at least some of the airborne particles onto the substrate surface. The ultrasonic vibrating device may be at a coating chamber and the substrate may be positionable within the coating chamber. A conveyor may be operable to convey substrates through the coating chamber, whereby the coating particles are guided onto the substrate surface as the substrate moves through the coating chamber.

12 Claims, 6 Drawing Sheets

U.S. PATENT DOCUMENTS

| | | | |
|---|---|---|---|
| 4,694,218 A | 9/1987 | Chao | |
| 4,824,712 A | 4/1989 | Falleroni et al. | |
| 4,830,879 A | 5/1989 | Debsikdar | |
| 4,864,084 A | 9/1989 | Cardinale | |
| 4,945,282 A | 7/1990 | Kawamura et al. | |
| 4,960,618 A | 10/1990 | Tanitsu et al. | |
| 4,965,096 A | 10/1990 | Deal et al. | |
| 4,996,083 A | 2/1991 | Moser et al. | |
| 5,002,928 A * | 3/1991 | Fukui et al. | 505/401 |
| 5,011,732 A | 4/1991 | Takeuchi et al. | |
| 5,013,607 A | 5/1991 | Sato et al. | |
| 5,062,198 A | 11/1991 | Sun | |
| 5,108,479 A | 4/1992 | Hirano | |
| 5,123,940 A | 6/1992 | DiGiovanni et al. | |
| 5,137,560 A | 8/1992 | Ohmura et al. | |
| 5,137,749 A | 8/1992 | Yamazaki et al. | |
| 5,145,113 A * | 9/1992 | Burwell et al. | 239/102.2 |
| 5,153,027 A | 10/1992 | Spagnoli | |
| 5,239,152 A | 8/1993 | Caldwell et al. | |
| 5,291,097 A | 3/1994 | Kawamura et al. | |
| 5,519,282 A | 5/1996 | Takizawa et al. | |
| 5,599,579 A | 2/1997 | Iwasaki | |
| 5,725,957 A | 3/1998 | Varaprasad et al. | |
| 5,742,118 A | 4/1998 | Endo et al. | |
| 5,770,258 A | 6/1998 | Takizawa et al. | |
| 5,789,854 A | 8/1998 | Takizawa et al. | |
| 5,833,892 A * | 11/1998 | Gurav et al. | 264/13 |
| 5,880,557 A | 3/1999 | Endo et al. | |
| 6,001,486 A | 12/1999 | Varaprasad et al. | |
| 6,087,012 A | 7/2000 | Varaprasad et al. | |
| 6,114,645 A | 9/2000 | Burgess | |
| 6,218,679 B1 | 4/2001 | Takahara et al. | |
| 6,380,497 B1 | 4/2002 | Hashimoto et al. | |
| 6,395,863 B2 | 5/2002 | Geaghan | |
| 6,440,491 B1 | 8/2002 | Varaprasad et al. | |
| 6,620,454 B2 | 9/2003 | Varaprasad et al. | |
| 6,627,918 B2 | 9/2003 | Getz et al. | |
| 6,706,552 B2 | 3/2004 | Getz et al. | |
| 7,165,323 B2 * | 1/2007 | Halsey et al. | 29/846 |
| 2002/0031622 A1 | 3/2002 | Ippel et al. | |
| 2002/0086188 A1 | 7/2002 | Halsey, IV et al. | |
| 2005/0037184 A1 | 2/2005 | Halsey, IV et al. | |

* cited by examiner

DISPLAY SUBSTRATE WITH DIFFUSER COATING

CROSS REFERENCE TO RELATED APPLICATION

The present application claims the benefit of U.S. provisional application, Ser. No. 60/607,332, filed Sep. 3, 2004, which is hereby incorporated herein by reference in its entirety.

FIELD OF THE INVENTION

The present invention relates to substrates with diffuser coatings deposited thereon and, more particularly, to a method of depositing a diffuser coating onto a surface of a substrate.

BACKGROUND OF THE INVENTION

It is known in the art to deposit a diffuser coating onto a surface of a substrate where the coating is atomized via pressurized air at an exit port of a liquid material or solution. The pressurized air causes atomization or vaporization of the liquid so that the particles may be deposited on the substrate surface. An example of such a coating process is described in U.S. Pat. Nos. 6,620,454; 6,440,491; 6,087,012; 6,001,486; and 5,725,957, which are hereby incorporated herein by reference.

An example of such a coating system or process is shown in FIG. 1. In such a coating system or process, an operator typically will place one substrate 1 or multiple substrates, such as six or so, into a coating chamber 2 and in a generally vertical orientation. After the substrates are positioned in the chamber, the high pressure air compressor 3 may be directed at the liquid coating material or solution or precursor solution 4 to atomize the particles. The high pressure air compressor may be operable to supply pressurized air at about 240 p.s.i. or thereabouts at the discharge end of the coating device. The high pressure air system generates a turbulent, random and generally uncontrolled spray or cloud of particles generally at the substrates. A low pressure air compressor 5 may then spray or guide some of the cloud of atomized coating particles toward the substrates to coat the substrate surface. The high pressure air system thus may tend to spray or blow the particles generally toward the substrates, but with a substantial amount of the particles missing the substrates and remaining in the air.

Due to the vapor or overspray or excess particles in the air after the high pressure atomization, the air in the chamber and surrounding the substrates is often circulated, such as via a large volume and high flow rate circulation and ventilation system 6, such as a circulation system or heating ventilation and air conditioning (HVAC) system operable to blow or move about 8000 cubic feet per minute (cfm) through the room and generally over the coated substrates, to remove the contaminated air from the chamber to limit or reduce unwanted particles from depositing on the substrates, which may cause irregularities in the surface coating. The removed contaminated air is exhausted from the chamber at an exhaust 7 and filtered by a filtration system 8 and burned or oxidized by an oxidation system 9 to remove the particles from the air before the air is exhausted to the atmosphere. The exhaust system, filtration system and oxidization system also are often specialized systems, in order to handle the high flow rate, such as about 8000 cfm or so, that is circulated by the HVAC system. The coated substrates are then manually removed from the chamber and uncoated substrates are manually placed in the chamber and the process is repeated.

Although such processes or systems or techniques work well for their intended purposes, there is often substantial waste of the coating material due to the high pressure air, which causes the liquid coating material to atomize or vaporize in a generally cloud-like form. The amount of waste is often in the range of about 80-90 percent or more of the material or solution that is atomized. Also, due to the difficulties in controlling the vaporized or airborne particles, the size of the airborne particles may vary, such that a non-uniform coating may occur at the substrate surface. Such known coating processes are typically manual labor intensive, and the capital costs associated with such high pressure atomizing systems and high flow air circulation systems and filtration and oxidation systems are often significant, such that the coating system may be costly to implement and to operate.

Therefore, there is a need in the art for a coating process or system that overcomes the shortcomings of the prior art.

SUMMARY OF THE INVENTION

The present invention provides a process or method or system for applying or depositing or establishing a diffuser coating and/or a protective coating onto a substrate surface. The system atomizes or vaporizes the liquid coating material via an ultrasonic vibrating device, and then guides the airborne coating particles onto the substrate surface via a low pressure air flow. The coating material, when deposited onto the substrate surface, provides a diffuser coating (or optionally may provide a protective coating) on the substrate surface.

According to an aspect of the present invention, a method of establishing a diffuser coating or a protective coating on a substrate surface includes providing a substrate having a surface, providing an ultrasonic vibrating device, and supplying a liquid coating material or precursor solution to the vibrating device. The vibrating device is vibrated to atomize or vaporize or particle-ize the coating material such that the particles are airborne. A low pressure air flow, preferably an air flow of less than about 80 p.s.i., more preferably lower than about 50 p.s.i., and most preferably at or lower than about 40 p.s.i. or thereabouts, is provided to guide at least some of the airborne particles onto the substrate surface. The substrate may be suitable for use as a cover plate or cover panel for a display or a touch screen device, and the coating may provide a diffuser coating on the substrate surface that reduces glare at the substrate surface while providing a desired or appropriate or sufficient amount of transparency and resolution when viewing through the coated substrate.

According to another aspect of the present invention, a system for establishing a diffuser coating on a substrate surface includes an ultrasonic vibrating device, a supply device and a low pressure air source. The supply device supplies a liquid coating material or precursor solution to the ultrasonic vibrating device. The ultrasonic vibrating device is operable to vibrate to atomize the coating material and to discharge airborne particles at a discharge end of the ultrasonic vibrating device. The low pressure air source generates low pressure air flow generally proximate to the discharge end to guide at least some of the airborne particles onto the substrate surface.

The ultrasonic vibrating device may be at a coating chamber and the substrate may be positionable within the coating chamber. A conveyor may be operable to convey substrates through the coating chamber, whereby the coating particles are guided onto the substrate surface as the substrate moves through the coating chamber. The low pressure air flow may guide the particles in a band that at least substantially encompasses the width of the substrate as the substrate moves through the coating chamber.

Therefore, the present invention provides an ultrasonic vibrating device for atomizing coating particles for coating a substrate surface. The diffuser coating provides a substantially uniform coating on the substrate surface. Because the coating system or method of the present invention does not include a high pressure air source and flow, the coating system or method substantially reduces waste and substantially reduces the unused airborne particles in the chamber, such that the high flow air recirculation systems and oxidizing systems are obviated. Also, because the coating system or method of the present invention more efficiently and effectively deposits the particles onto the substrate surface, the substrates may be moved or conveyed along and generally under the coating device, such as via a conveying system, thereby substantially reducing the labor requirements and providing a low cost coating process that is capable of coating a high volume of substrates. The present invention thus may provide an in-line coating process that utilizes a reduced amount of manual labor and reduced amount of handling of the substrates.

These and other objects, advantages, purposes and features of the present invention will become apparent upon review of the following specification in conjunction with the drawings.

DESCRIPTION OF THE PREFERRED EMBODIMENTS

Figure 1:
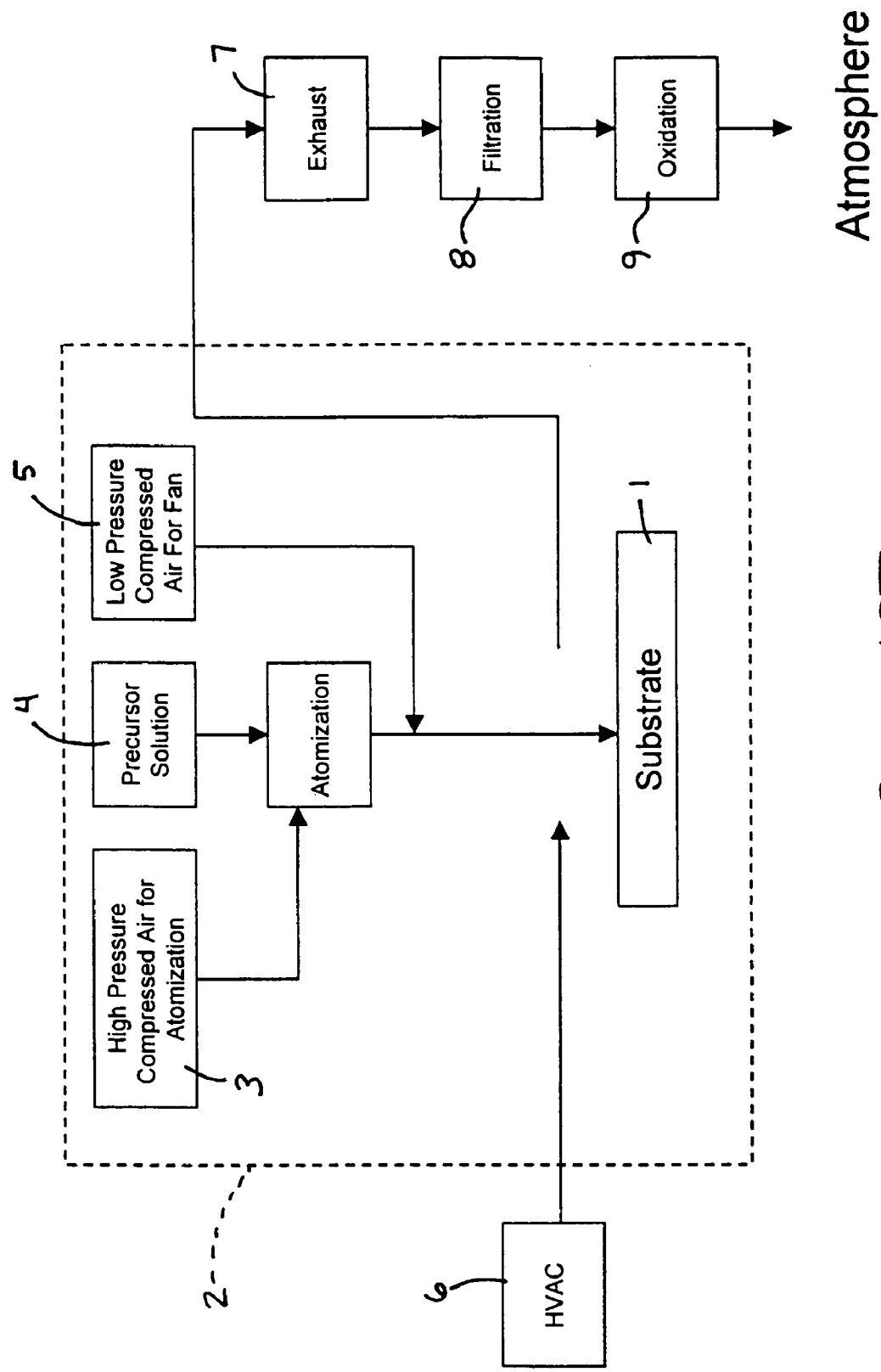
FIG. 1 is a block diagram of a known coating system.
Figure 2:
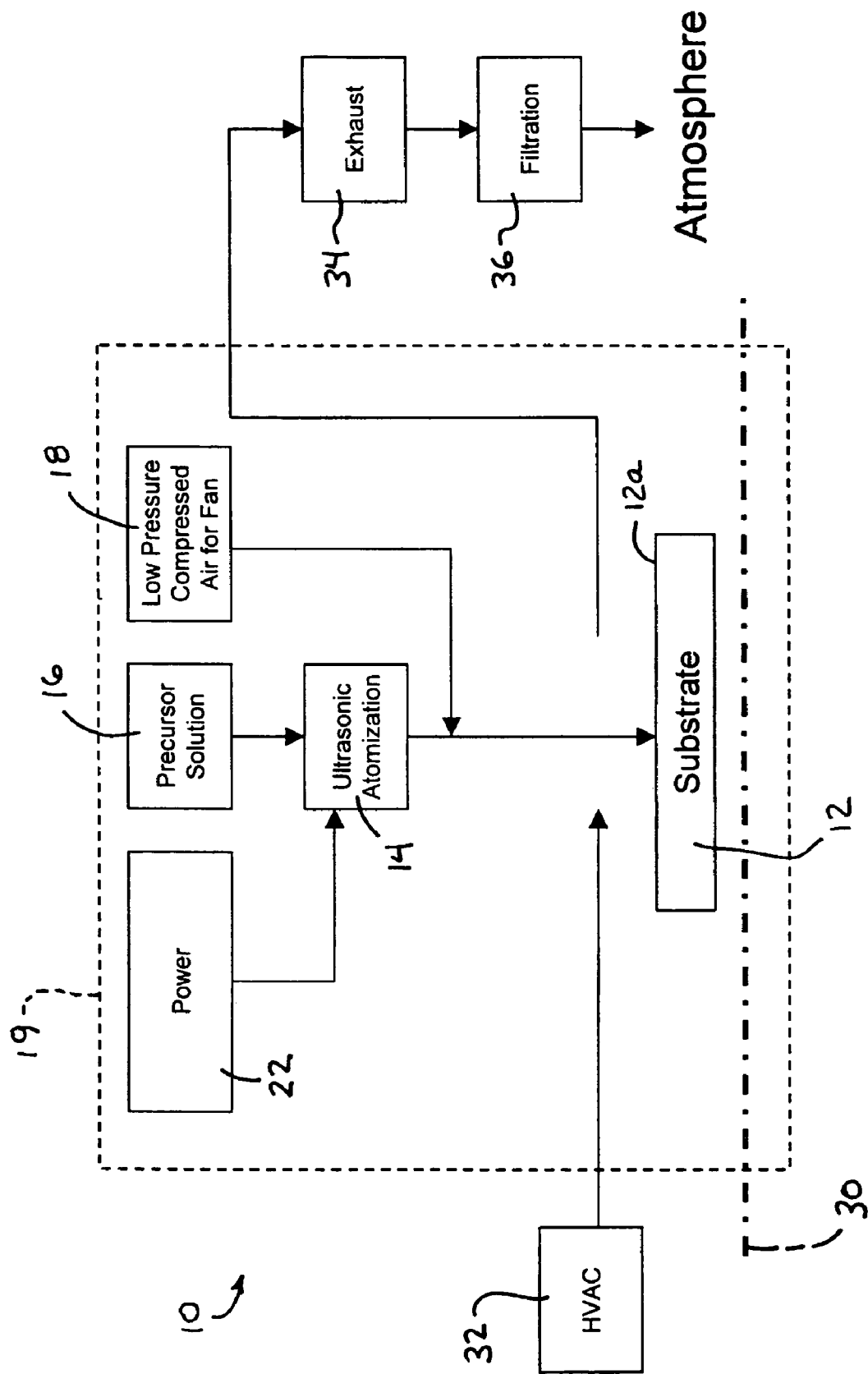
FIG. 2 is a block diagram of a coating system in accordance with the present invention.

Referring now to the drawings and the illustrative embodiments depicted therein, a coating system or process 10 for depositing or applying a coating onto a surface 12a of a substrate 12 includes a spraying or atomizing device 14 to atomize a liquid coating material or precursor solution 16 into the desired or appropriate particle size for deposition onto the substrate surface 12a (FIG. 2). The atomizing device 14 includes a vibrating device 15 (FIG. 5) that is operable to vibrate the precursor solution 16 and discharge airborne particles for coating or depositing onto the substrate surface. The coating system 10 includes a low pressure air compressor 18 for blowing or providing air flow at a low or reduced pressure to guide or blow the airborne coating particles toward and onto the substrate surface. The substrate or substrates may be positioned within a coating chamber 19, and may be conveyed or moved through the coating chamber during the coating process, as discussed below. The coating particles, when deposited on the substrate surface, provide a diffuser coating on the substrate surface that provides reduced glare while providing sufficient transparency and resolution when viewing through the coating and the substrate. The substrate may comprise a cover plate for a display or touch screen device, as discussed below. Optionally, the coating system or process of the present invention may be implemented to establish a protective coating on a surface of a substrate.

Optionally, the substrate may be suitable for use in a wide variety of applications, such as cathode ray tube screens or other display devices (such as monitors, televisions, liquid crystal displays or the like), input or selection devices, such as touch screens or input panels, glass enclosed displays or the like, optical filters, picture frames, windows for architectural applications, glass components employed in mirrors, solar collector cover plates, optical lenses, such as utilized in eyewear and viewing devices, windshields for vehicles, and/or the like. Optionally, the substrate may comprise an ultrathin glass substrate or sheet, such as a glass substrate having a thickness of less than approximately 1 mm, preferably less than approximately 0.5 mm, more preferably less than approximately 0.1 mm, such as about 0.05 mm or thereabouts. The substrate thus may be suitable for use with touch screen type devices, such as the types described in U.S. Pat. Nos. 6,706,552; 6,627,918; 6,620,454; 6,440,491; 6,087,012; 6,001,486; and/or 5,725,957; and/or U.S. patent applications, Ser. No. 09/946,228, filed Sep. 5, 2001 by Ippel et al. for PLASTIC SUBSTRATE FOR INFORMATION DEVICE AND METHOD FOR MAKING SAME; Ser. No. 10/744,522, filed Dec. 23, 2003 by Halsey et al. for METHOD FOR MAKING AN INTERACTIVE INFORMATION DEVICE; Ser. No. 10/798,171, filed Mar. 11, 2004 by Getz for LASER DELETION FOR TOUCH SCREEN; and/or Ser. No. 10/710,164, filed Jun. 23, 2004 by Halsey et al. for HIGH DURABILITY TOUCH SCREEN AND METHOD FOR MANUFACTURING, now U.S. Pat. No. 7,165,323, which are all hereby incorporated herein by reference.

The substrate 12 comprises a transparent substrate. The substrate material may comprise a wide variety of suitable substrate materials, such as substantially transparent glass, such as clear soda lime glass or borosilicate glass. For example, the substrate may comprise clear glass having a transmittance greater than about 70 percent, and preferably greater than about 85 percent. The substrate may also be coated with a functional coating, such as a transparent conductive coating, such as a doped tin oxide, indium tin oxide (ITO), doped zinc oxide or other suitable substantially transparent and conductive coatings or layers, with the diffuser coating deposited onto the functional coating so that the functional coating is overcoated with the diffuser surface coating.

The liquid coating material or precursor solution of the diffuser coating may comprise any known and suitable diffuser coating material, without affecting the scope of the present invention. For example, the precursor solution may comprise one or more metal oxide precursors, such as alkoxides, halides, oxyhalides, acetates, peroxyesters, nitrates, and/or the like, organic solvents, such as one or more alcohols, esters, ethers, anhydrides, and/or the like, and one or more acids, such as organic and inorganic acids and/or the like. Examples of such precursor solutions that are suitable for use with the coating system of the present invention are more fully described in U.S. Pat. Nos. 6,620,454; 6,440,491; 6,087,012; 6,001,486; and 5,725,957, which are hereby incorporated herein by reference, and reference is made to those patents for a detailed description of a suitable precursor solution. However, other solutions may be implemented with the ultrasonic coating process or system without affecting the scope of the present invention.

With reference to FIG. 5, ultrasonic vibrating device 15 includes a passageway 20, which receives the liquid precursor solution at a feed or inlet end 20a. The passageway extends through vibrating device 15 and atomizing device 14 and defines a discharge end 20b opposite to the inlet end 20a. The liquid precursor solution 16 may be fed into the inlet end 20a, such as via a low pressure pump or the like, and may pass along and through the passageway 20, where the vibrating device vibrates to break up or atomize the liquid solution, such that particles of the precursor solution are discharged at discharge end 20b.

Figure 5:
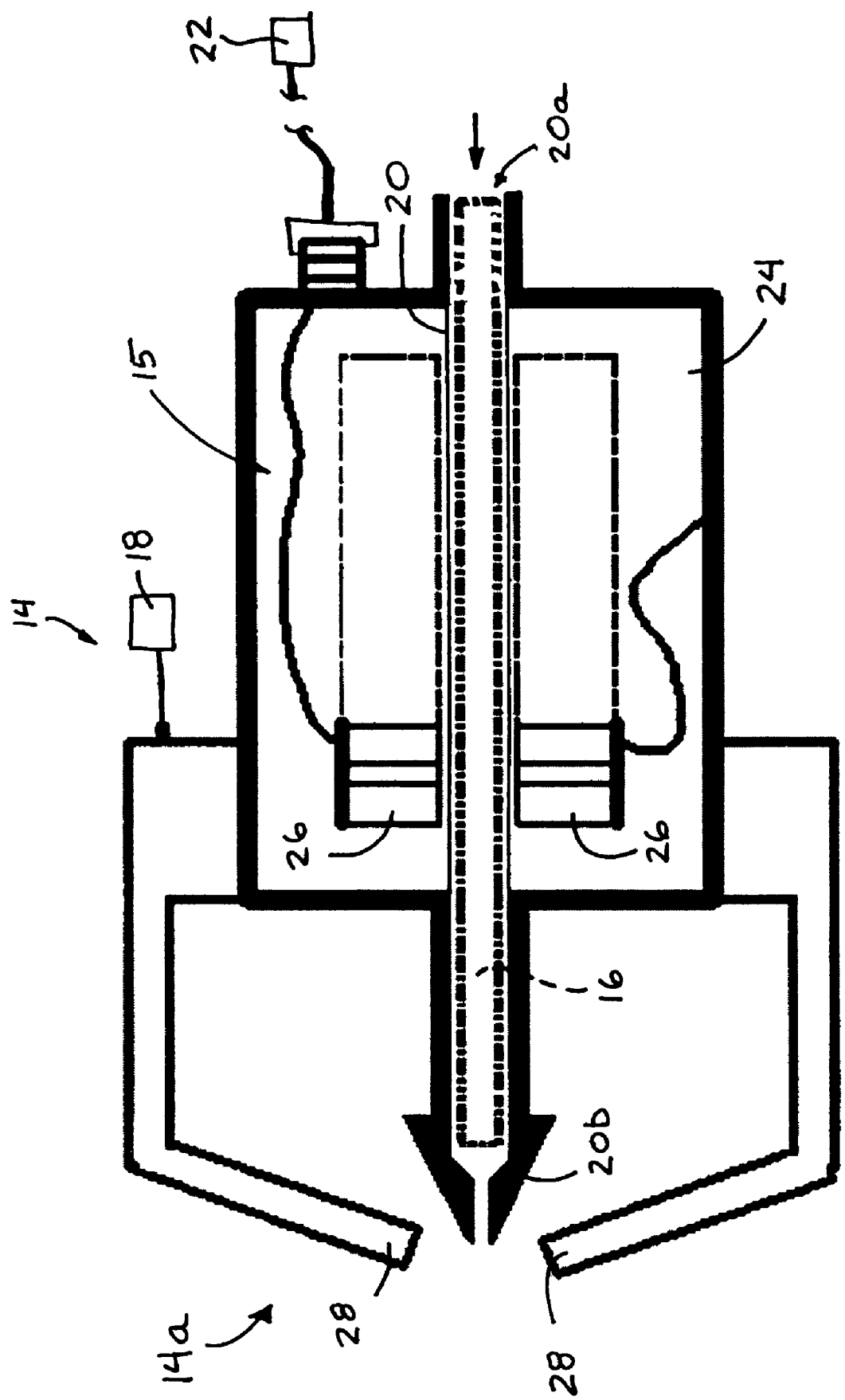
FIG. 5 is a partial sectional view of the spray device of FIG. 4.

As shown in FIGS. 2 and 5, ultrasonic vibrating device 15 may be connected to a power source 22, which powers the device to vibrate and thus atomize the particles. As shown in FIG. 5, ultrasonic vibrating device 15 may include a housing portion 24 that houses a piezoelectric vibrating element or elements or transducers 26 that generate the vibration when energized by the power source. The vibration causes the liquid precursor solution within the passageway 20 to break up or atomize into particles, which are then discharged out the discharge end 20b of vibrating device 15. Such an ultrasonic vibrating device may be similar to the ultrasonic vibrating device commercially available from Sono-Tek Corp. of NY, such that a detailed discussion of the vibrating device need not be set forth herein.

The ultrasonic vibrating device may vibrate to generate particles having a size dimension of about 10-15 microns, and preferably substantially within a range of about 1 micron to about 35 or 40 microns, with a substantial portion of the particles being about 10-15 microns in size. The ultrasonic vibrating device thus provides a more uniform particle size distribution than that provided by the high pressure system, which typically has particles within a range of about 1 micron to about 80 microns. The vibrating device 15 may be received in or positioned in or secured in a housing portion of the atomizing or spraying device 14.

Figure 4:
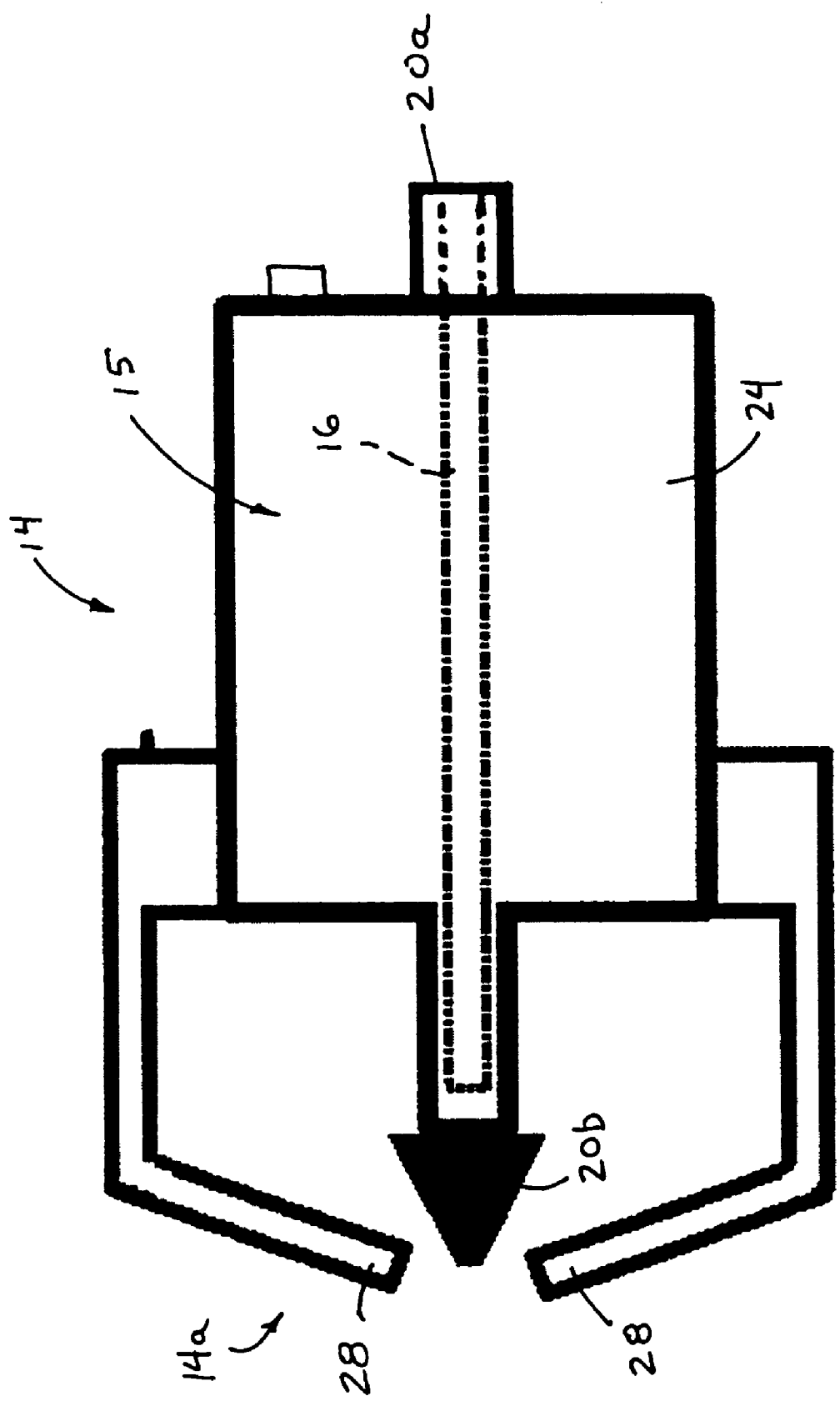
FIG. 4 is a side elevation of a spray device having an ultrasonic vibrating device suitable for use with the coating system of the present invention.

As shown in FIGS. 4 and 5, the discharge end 20b of passageway 20 of vibrating device 15 may be generally centrally located at a discharge or dispensing end 14a of the spraying device or atomizing device 14. Discharge end 14a of atomizing device 14 may include a pair of spaced apart and generally opposed air jets 28 at opposite sides or regions of the discharge end 20b of vibrating device 15. The air jets 28 may direct low pressure air flow toward the airborne particles discharged from discharge end 20b of vibrating device 15 to focus or direct or guide the airborne particles into the desired form for spraying or depositing onto the substrate surface. The air pressure supplied by the low pressure air compressor 18 is preferably less than about 100 p.s.i., more preferably less than about 80 p.s.i., more preferably less than about 50 p.s.i., and most preferably at or less than about 40 p.s.i. or thereabouts.

In the illustrated embodiment, the air jets 28 direct the low pressure air from opposite sides of the discharge end 20b of vibrating device 15 so as to provide a focused spray or pattern of particles in one direction, with a wider band or pattern of particles in the other direction, thereby providing a generally fan-shaped spray pattern of the particles. The spray pattern thus may encompass the width of the substrates while the substrates are positioned or moved below or in the path of the sprayed particles. Optionally, multiple ultrasonic vibrating and spray devices (such as, for example, four or more devices) may be positioned side by side to combine to cover or span the width of the substrates, with each spray device covering or spanning a portion of the width. The atomizing device or devices thus may be generally or substantially fixedly positioned at a spray fixture or chamber, while the substrates may be moved through the spray pattern to receive the coating at least substantially over the exposed surface of the substrate.

Figure 6:
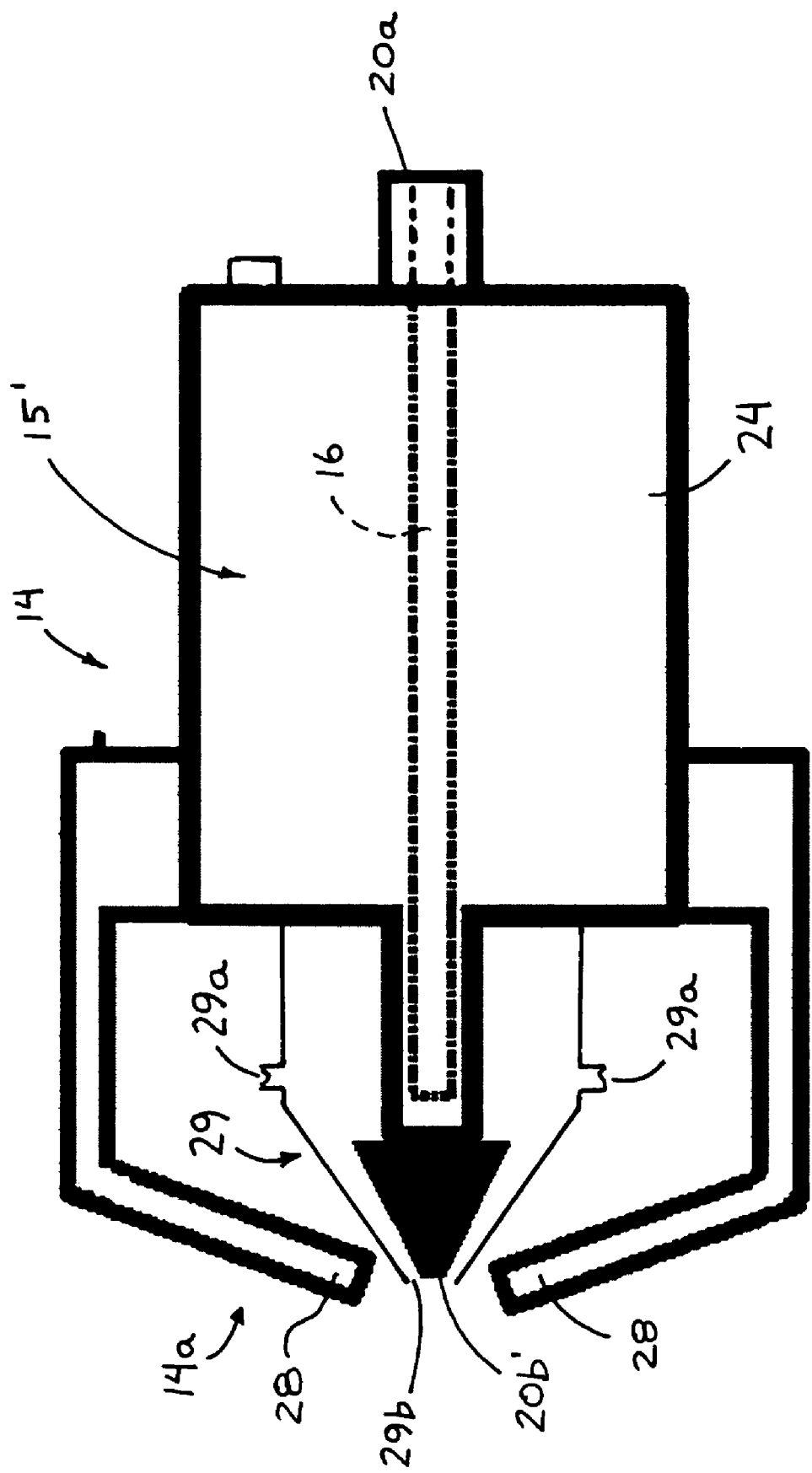
FIG. 6 is a side elevation and partial sectional view of another spray device in accordance with the present invention.

Optionally, and with reference to FIG. 6, a vibrating device 15' may include a secondary air atomization jet 29 that is substantially or generally coaxial to the ultrasonic nozzle or discharge end 20b', in order to further reduce the size dimension of particles discharged by the vibrating device. The secondary jet 29 may receive air flow through one or more inlet ports 29a (two inlet ports are partially shown in FIG. 6, and the ports connect to or are in fluid communication with an air supply so as to provide air flow into and through the inlet port or ports of the secondary jet) and may channel the air flow and discharge the air flow at a discharge opening or end 29b that is generally at the discharge end 20b' of vibrating device 15', so that the low pressure air flow at the discharge end may further atomize the particles being discharged by the vibrating device. In such an embodiment, air pressures of below about 80 p.s.i., and preferably below about 20 p.s.i., may be used for air flow through the secondary air atomization jet. The secondary atomization jet may be connected to the low pressure air supply that supplies the low pressure air flow to the air jets 28 or may be connected to a separate low pressure air supply, without affecting the scope of the present invention. Preferably, the secondary atomization jet provides a lower pressure air supply than the pressure of the air that flows from the jets 28.

The low pressure air flow of the secondary atomization jet thus is provided at and generally or substantially or entirely around the discharge end of the vibrating device (such as a generally conical or cylindrical passageway around the discharge end of the vibrating device to provide low pressure air flow generally along or generally coaxial with the flow of particles being discharged from the vibrating device) to enhance atomization of the particles of the precursor solution as the particles exit the vibrating device. The vibrating device 15' may otherwise be substantially similar to vibrating device 15, discussed above, such that a detailed discussion of the vibrating devices will not be repeated herein. The similar or common components or elements of the vibrating devices are shown in FIG. 6 with the same reference numbers used in FIGS. 4 and 5 with respect to vibrating device 15.

Because the precursor solution is atomized via ultrasonic vibration rather than high pressure air, the atomized particles are not spread or sprayed as they are atomized and thus are more readily controlled and directed and guided by the low pressure air flow. Accordingly, a substantially higher percentage of particles reaches the substrate surface than in the known high pressure systems. Testing has shown that approximately 90 percent of the particles dispensed by the ultrasonic atomizing device are deposited on the substrate surface, while only about 5-10 percent of particles reach the substrate surface during high pressure deposition. This results in substantially reduced waste so that the ultrasonic coating process or system utilizes a substantially reduced amount of precursor solution.

Also, because the precursor solution is atomized via ultrasonic vibration rather than high pressure air, and the atomized particles are guided onto the substrates via a low pressure air flow, the substrates may comprise ultrathin glass substrates or sheets, such as described above. The ultrathin substrates may be coated by the low pressure air and vibration system without breaking. Such breaking of thin glass substrates may often occur during the known high pressurized air coating processes due to the high pressure air flow that atomizes the precursor solution.

As shown in FIG. 2, coating system 10 may include a conveyor or conveying device 30 that is operable to convey or move the substrates through the coating chamber 19 and under the spraying or atomizing device 14. The conveyor may be loaded with substrates at one end of the coating chamber, such that the substrates are then conveyed or moved into the coating chamber and coated by the coating device. The coated substrates are then conveyed out of the coating chamber, such as at the other end of the coating chamber. The coating process or system may include a conveyor because the excess airborne particles are minimized and, thus, there are fewer contaminants in the chamber that may escape through the openings in the chamber that are typically needed for the conveyor and substrates to pass through the walls of the coating chamber. The conveyor may be substantially continuously moving to move the substrates into and out from the coating chamber without having to independently and manually place the substrates inside the chamber. As the substrates are continuously moved through the coating chamber and under the spraying or atomizing device, the spray pattern of the device or devices provides a focused spray onto the substrate surfaces that encompasses the width of the substrates (the dimension generally across the conveying surface) and that coats the substrates surfaces as they are moved or conveyed through the spray pattern.

As shown in FIG. 2, the coating system includes a circulation system or heating, ventilation and air conditioning (HVAC) system 32 for blowing or moving air through the coating chamber 19, and an exhaust system 34 for moving or drawing air out of the chamber, so that the air is circulated through the chamber. The coating system also includes a filtration system 36 that filters the air that is flowing from the exhaust system, preferably filtering the air to particle sizes of about one micron or less so that the air is substantially free of contaminants after filtration of the air and before it is exhausted or vented to the atmosphere. The HVAC system, the exhaust system and the filtration system may be operable to move or blow or handle air flows of about 1000 cubic feet per minute or thereabouts. The lower air flow systems may be implemented with the coating system of the present invention due to the substantially reduced airborne particles during the coating process by the ultrasonic coating system of the present invention. Also, the filtered air may then be exhausted or vented to atmosphere without further treating, such as oxidation or the like, being required to maintain the emissions within the desired or required levels.

The substantially reduced amount of excess or wasted airborne particles (for example, about ten percent for the ultrasonic vibration coating system as compared to about ninety percent for the high air pressure system) allows the vibration coating system to avoid having to implement high volume flow/circulation systems and oxidation systems and specialized high volume exhaust systems and high volume filtration systems. The vibration system of the present invention thus may be implemented with a lower flow circulation system, such as a heating, ventilation and air conditioning system operable to circulate air through the chamber at approximately 1000 cubic feet per minute (cfm). Likewise, the exhaust system may be a lower cost exhaust system due to the lower circulation air flow rates, while the filtration system may be a lower cost filtration system since it only has to filter the air at a flow rate of about 1000 cfm, rather than the 8000 cfm flow rate typically used with the high air pressure systems. Also, because the residual particles in the air after coating are substantially reduced, the vibrational coating process obviates the need for an oxidation system or process, since the emissions in the air are typically below the levels at which such oxidation of the air is deemed necessary. The coating process or system of the present invention thus provides a lower cost system that requires lower cost HVAC systems and filtration systems to treat the air within the coating chamber.

Figure 3:
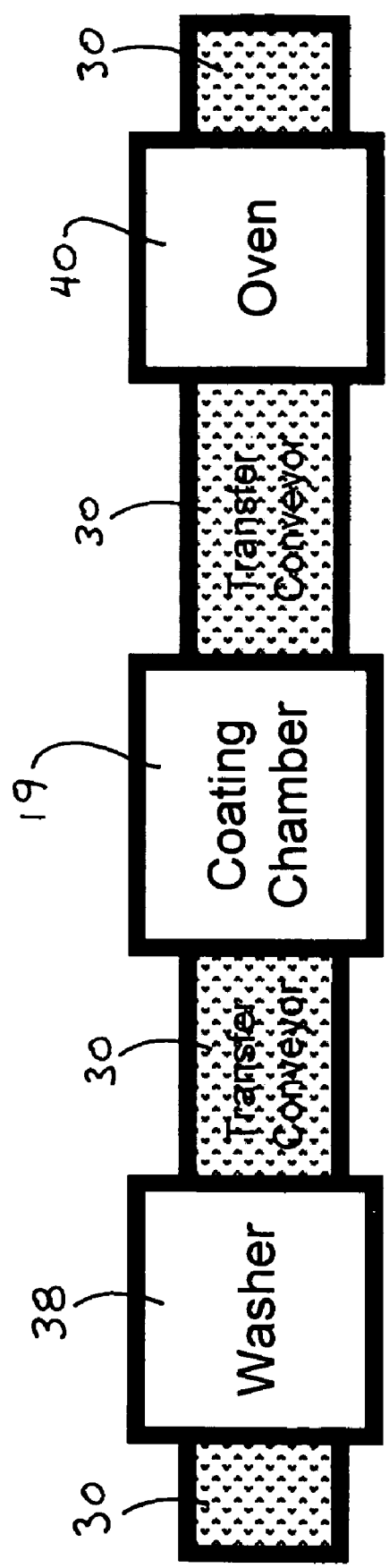
FIG. 3 is a block diagram of a washing, coating and curing process in accordance with the present invention.

Optionally, the substrates may be cleaned or washed during a washing process prior to entering the coating chamber. As shown in FIG. 3, the substrates may be loaded onto the conveyor 30 and conveyed into a washing chamber or chambers 38 and then into the coating chamber 19. Optionally, the coated substrates may be conveyed out from the coating chamber and further conveyed or moved into a thermal curing chamber or oven 40 (or other curing equipment), where the coating or coatings are cured onto the substrate surface. The substrates may then be conveyed or moved out of the oven and removed from the conveyor by an operator. The present invention thus may provide a washing process, coating process and curing process without requiring manual or operator interference with the substrates during the processes, and thus provides an efficient process that is capable of coating high volumes of substrates, and reduces handling of the substrates to reduce the losses that may otherwise occur during handling of the substrates.

Accordingly, during operation, an operator may place substrates onto the conveying surface, such as on fixtures placed on or attached to a conveying surface, at an inlet or input to the washing chamber. The conveyor then conveys the substrates through the washing chamber where the exposed surface of the substrates are washed or cleaned to provide a substantially pristine surface. The conveyor conveys the substrates out of the exit of the washing chamber and into the inlet of the coating chamber. As the substrates are conveyed along the conveying chamber and generally below the coating device, the coating device or devices atomize the precursor solution via the ultrasonic vibrating device and guide the atomized particles onto the substrates via the low pressure air supply. As this is done, the circulation and exhaust system may circulate the air within the coating chamber to limit and remove excess particles in the air and thus to limit unwanted deposition of the particles on the substrates or elsewhere. The circulated air is filtered and exhausted or vented to the atmosphere. Optionally, other coatings or elements or layers may be applied to the substrates along the conveying line, depending on the particular application of the substrates and coating process. The coated substrates are conveyed out of the coating chamber and may be further conveyed to a curing chamber where the diffuser coating and/or other coatings or elements may be cured on the substrates. After curing, the substrates are conveyed out of the curing chamber and may be removed from the conveyor by another operator.

Therefore, the present invention provides a diffuser coating process that coats or applies a diffuser coating onto a substrate surface without high pressure air. The present invention provides an ultrasonic vibrating device for atomizing coating particles for coating the substrate surface with the diffuser coating. The ultrasonic coating system or process atomizes the precursor solution to a substantially uniform or reduced range size and thus provides or deposits a substantially uniform diffuser coating on the substrate surface. The ultrasonic coating system or process of the present invention provides a controlled and/or tuned spray pattern or deposition pattern that may be directed and/or adjusted to accommodate the particular application of the system, such as for different sized substrates or the like.

Because the coating system or process of the present invention does not include a high pressure air source and flow, the coating system or process substantially reduces waste and substantially reduces the unused airborne particles in the chamber. The coating system or method of the present invention thus uses a reduced amount of precursor solution and obviates the need for high flow air recirculation systems, high flow exhaust systems, high flow filtering systems and oxidizing systems. The coating system or process of the present invention thus provides a system that coats the substrate surfaces in a highly efficient manner and provides substantially reduced waste as compared to the high pressure coating systems, and that utilizes equipment having substantially reduced costs as compared to the high flow and high pressure equipment of known coating systems.

Also, because the coating system or method of the present invention more efficiently and effectively deposits the particles onto the substrate surface, the substrates may be moved or conveyed along and generally under the coating device, such as via a conveying system, thereby substantially reducing the labor requirements and providing a low cost coating process that is capable of coating a high volume of substrates. The ultrasonic coating system of the present invention thus provides an in-line coating system or process that does not require manual handling of the substrates and placing of the substrates in fixtures within the coating chamber. The glass substrates may comprise ultrathin glass substrates (such as substrates having a thickness of less than about 0.1 mm), since the substrates are not handled by an operator during the coating process and since the coating process does not utilize high pressure air to atomize the coating particles.

Changes and modifications to the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A method of establishing a diffuser surface coating on a substrate surface, said method comprising:
   providing a transparent substrate having a surface;
   providing an ultrasonic vibrating device;
   supplying a liquid coating material to said ultrasonic vibrating device;
   vibrating said ultrasonic vibrating device to atomize the coating material such that particles of the coating material are airborne;
   guiding said airborne particles via a low pressure air flow to guide said airborne particles onto the substrate surface to establish a coating of said coating material at said substrate surface, said low pressure air flow comprising an air flow of less than about 100 p.s.i; and
   curing said coating to form a durable diffuser coating at said substrate surface that provides reduced glare and that provides sufficient transparency and resolution when viewing through said coating and said transparent substrate when said diffuser coated substrate is used as a substrate for at least one of (a) a display device and (b) a touch screen device.

2. The method of claim 1, wherein said low pressure air flow is at a pressure of less than about 80 p.s.i.

3. The method of claim 1, wherein said low pressure air flow is at a pressure of less than or equal to about 40 p.s.i.

4. The method of claim 1, wherein said ultrasonic vibrating device is at a coating chamber.

5. The method of claim 4 including conveying said substrate through said coating chamber, said particles being guided onto the substrate surface as said substrate moves through said coating chamber.

6. The method of claim 5, wherein said low pressure air flow guides said particles in a band that encompasses the width of the substrates as said substrate moves through said coating chamber.

7. The method of claim 5, wherein conveying said substrate includes conveying said substrate through a washing process before conveying said substrate through said coating chamber.

8. The method of claim 7, wherein conveying said substrate includes conveying said substrate through a curing process after conveying said substrate through said coating chamber.

9. The method of claim 1, wherein said substrate comprises a glass substrate having a thickness of less than about 1 mm.

10. The method of claim 1, wherein said substrate comprises an ultrathin glass substrate having a thickness of less than or equal to about 0.1 mm.

11. The method of claim 1, wherein said ultrasonic vibrating device atomizes said liquid coating material into particles having a diameter substantially within a range of 1 micron to 40 microns.

12. The method of claim 1 including providing a low pressure air flow at a discharge of said ultrasonic vibrating device to further atomize the coating material.

* * * * *